(12) United States Patent
Deb et al.

(10) Patent No.: US 7,949,575 B1
(45) Date of Patent: May 24, 2011

(54) ACCOUNT RELATED TASK PROCESSING

(75) Inventors: Indrojit Deb, Redmond, WA (US);
Neeraj Garg, Redmond, WA (US);
David J. Brennan, Redmond, WA (US);
Michael T. Daly, Redmond, WA (US);
Stuart H. Marshall, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1437 days.

(21) Appl. No.: 10/750,436

(22) Filed: Dec. 30, 2003

(51) Int. Cl.
*G06Q 10/00* (2006.01)
(52) U.S. Cl. .............................. 705/26.8; 705/34; 705/38
(58) Field of Classification Search .................. 705/26.8
See application file for complete search history.

(56) References Cited

U.S. PATENT DOCUMENTS

| | | | |
|---|---|---|---|
| 6,470,325 B1 | 10/2002 | Leemhuis | |
| 6,473,740 B2 | 10/2002 | Cockrill et al. | |
| 6,639,975 B1 | 10/2003 | O'Neal et al. | |
| 6,718,369 B1 | 4/2004 | Dutta | |
| 7,107,285 B2 * | 9/2006 | von Kaenel et al. | 1/1 |
| 7,177,859 B2 * | 2/2007 | Pather et al. | 707/3 |
| 7,236,950 B2 * | 6/2007 | Savage et al. | 705/34 |
| 2004/0002988 A1 * | 1/2004 | Seshadri et al. | 707/102 |
| 2004/0133487 A1 * | 7/2004 | Hanagan et al. | 705/34 |

OTHER PUBLICATIONS

A text (pdf) US 7107285 B2 to facilitate navigation using a paragraph numbering scheme.*
R.E. Filman and D.D. Lee. Managing distributed systems with smart subscriptions. Proc. International Conference on Parallel and Distributed Processing Techniques and Applications, 2000. 7 pages.
H. Rebecca Callison. A Periodic Object Model for Real-time Systems. Proceedings of the 16th International Conference on Software Engineering, pp. 291-300, 1994.

* cited by examiner

*Primary Examiner* — Lynda C Jasmin
*Assistant Examiner* — Mark A Fleischer
(74) *Attorney, Agent, or Firm* — Shook, Hardy & Bacon L.L.P.

(57) ABSTRACT

A system for periodic and real-time processing of accounts. The system operates in a bulk mode and an error mode. A bulk component concurrently processes a set of eligible accounts with a set of dependent tasks, and a removal component removes one or more accounts from the eligible accounts if an error is associated therewith. In bulk mode, each task fetches only the required set of accounts/subscriptions/payment instruments for processing. In error mode (retry/reprocess mode), if an account encounters an error for a task in the bulk mode, the account drops is removed from bulk mode and becomes ineligible for fetching in any future bulk-mode task processing. Error-mode processing tests and processes all tasks sequentially for an errored account until the account state is in par with the accounts being processed by bulk mode. Then the account is removed from error mode processing and is picked up appropriately by bulk-mode processing.

22 Claims, 6 Drawing Sheets

ACCOUNT RELATED TASK PROCESSING

TECHNICAL FIELD

This invention is related to software system, and more specifically to accounts processing services.

BACKGROUND OF THE INVENTION

The advent of the Internet has facilitated the use of subscription services provided any number of subscribers. In a subscription processing system, relationships are maintained for subscribers with respect to specific subscriptions purchased, its associated services, specific payment instruments to be used for billing, specific payment methods to be used, etc. For every such customer, an entity called an account is maintained, along with the associated subscription, service, and payment instrument entities. It is essential that the system take all the necessary accounting actions on a periodic basis as the business demands. For example, every month, subscriber accounts need to be task-processed for charges, given any resources and charge adjustments, processed for cancellations, expirations or renewal, have services enabled, disabled, provisioned or de-provisioned, emails sent according to various events to keep the customers informed, etc. The system performs these tasks periodically (e.g., daily) to keep the state of the accounts in synchronism with the passage of time. In most cases, these account tasks must be performed in a certain order. Thus, a second task is dependent on first task, and requires the first task to be successfully completed before the second task can be completed.

Periodic processing of this inter-dependent set of tasks is what keeps the customer accounts consistent and up to date as defined by business processes. As indicated previously, it is important that the dependent tasks are performed in order and the dependency is strictly enforced. It is equally important for the business that processing be done for potentially millions of accounts/subscriptions on a daily basis in a reasonable amount of time, e.g., not more than 3-4 hours every day. This is important so that customer initiated actions (e.g., signups, self care), customer service representative (CSR) initiated support actions (e.g., credits, adjustments) and other system actions (e.g., payment processing) have accounts in a consistent state to work with. This also allows completing periodic processes during the lull period for other activities so that they do not compete with each other for system resources. Further, because of hardware, software, business or operational issues, at times periodic processes may not run regularly. As such, it is desired to have the capability to process multiple days worth of processing in a single day to recover.

Even though periodic processes are done during the lull period for other activities and it only takes 3-4 hours to complete them, other activities on the account cannot be blocked. Hence, a 'catch-up process' is provided that can bring this particular account to a consistent state on demand.

Thus, periodic processing of the tasks has at least the following requirements. First, the order and dependency of these tasks is required to be strictly enforced for a given customer account. Second, task processing for all needs to be completed in a reasonable amount of time, e.g., 3-4 hours. Third, there needs to be a way to bring an account to a consistent state on demand. One way to address the first requirement would be to visit each account and all of its associated subscriptions, payment instruments, etc., every day, and test whether the account needs processing for all the different related tasks. However, the first requirement has performance implications that can seriously jeopardize the second requirement. For example, if there are ten million accounts and fifteen related tasks, it would require processing to completion 150 million such tests each day. Even if only testing was being performed for the whole four hours, each test for each account would need to be completed in ninety-five microseconds. After performing through the 150 million tests, based on empirical evidence, approximately only one percent tests will result in actual processing work.

What is needed is an improved processing technique for handling large numbers of accounts.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a system that facilitates periodic processing technique in a bulk mode and an error mode. There is provided a catch-up component that allows real-time actions to perform the work of periodic processing, on demand. There is also provided a bulk component that concurrently processes a plurality of eligible accounts with a set of dependent tasks, and a removal component that removes one or more accounts from the eligible accounts as errored accounts if an error is associated therewith. In bulk mode, each task fetches only the required set of accounts/subscriptions/payment instruments for processing. In error mode (retry/reprocess mode), if an account encounters an error for a task in the bulk mode, the account drops out of the bulk mode and becomes ineligible for fetching in any future bulk-mode task processing. The error-mode processing tries to test and process all tasks for an account sequentially until the account state is in par with the rest of accounts being processed by bulk mode. Then the account is removed from error mode processing and is picked up appropriately by bulk-mode processing.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
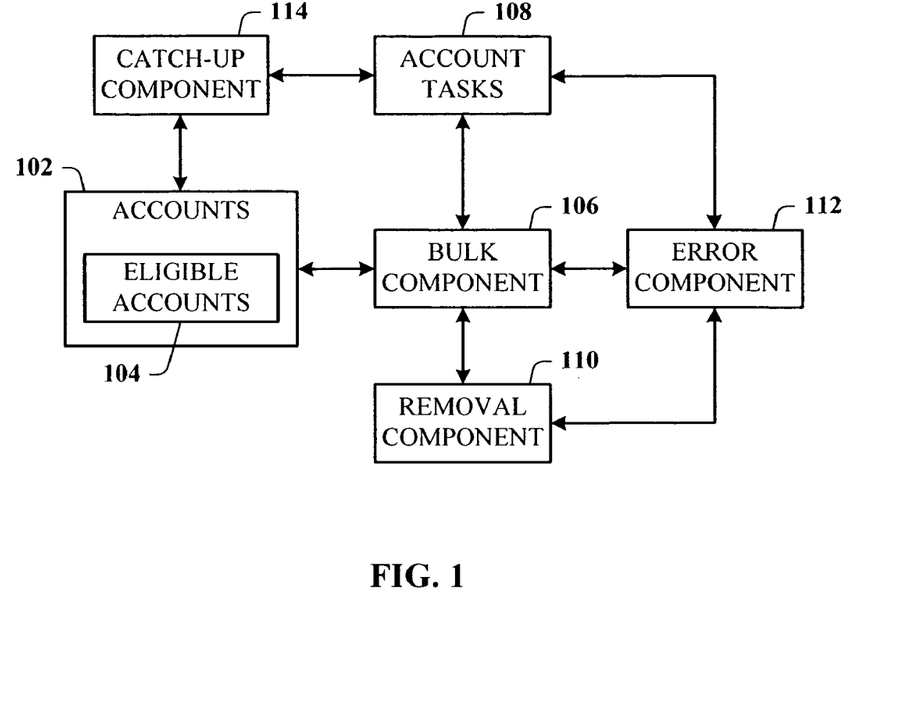
FIG. 1 illustrates a block diagram of a system of the present invention.

Referring now to FIG. 1, there is illustrated a block diagram of a system 100 of the present invention. Account processing of millions of subscriber accounts poses an enormous challenge to conventional systems, since processing must be completed in a relatively short period of time, and on a regular basis. The novel periodic processing approach facilitates the expeditious processing of a large number of subscriber accounts by performing the processing in two modes: a bulk mode and an error mode. Bulk mode consists of first performing processing on those accounts required for processing (i.e., "eligible" accounts), and only those that are error-free based on the tasks that are being run against those accounts. There is also provided the capability to perform real-time processing of accounts outside of the periodic processing aspect on a demand basis.

In support thereof, the system 100 includes a number of subscriber accounts 102 that need to be processed on a required basis. In accordance with periodic processing of the present invention, a select group of eligible accounts 104 related to the tasks to be performed can be determined and processed in a bulk-processing mode utilizing a bulk component 106. Bulk processing occurs in accordance with one or more account tasks 108, which tasks component 108 interfaces to the bulk component 106. There is also provided a removal component 110 that interfaces to the bulk component 106 to facilitate the removal of those eligible accounts that exhibit an error for a given task during bulk processing, and thus, impede bulk processing. The errored accounts are removed for processing by an error component 112 that process all tasks against the single account in order to resolve the error(s). The error component 112 interfaces to the bulk component 106, account tasks component 108, and the removal component 110. Once resolved, the account is merged back into bulk processing by the bulk-processing component 106. Note that the bulk component 106 processes the eligible accounts concurrently with the tasks being applied to those accounts. Furthermore, the bulk component 106 performs bulk processing concurrently with error processing by the error component 112. A catch-up component 114 interfaces to both the account tasks component 108 and the accounts 102 such that real-time processing of accounts can be performed on a demand basis, which is outside of the periodic processing aspect of the system 100. This is useful where a subscriber wishes to cancel a subscription and wants to know the amount of the charges incurred to the point of cancellation, for example. The catch-up component 114 brings the account forward or up-to-date to the current date or the date the subscriber requested.

More specifically, in bulk mode, each task includes its own preset criteria and fetches only the required set of accounts/subscriptions/payment instruments for processing. Effectively, all of the tasks together produce a required number of processing candidates across the whole set of accounts. Note that although account is used as the unit herein, in general, this is can be an object with sufficient scope so that actions on another instance of this object do not affect the state of a particular object. For example, where a subscription can be transferred from one account to another, account-level will not be at a sufficient level of granularity. Conversely, a finer grain of granularity can be chosen.

In general, assuming a dependency granularity of an account, for a given account, a given periodic processing task for a given day can be dependent on one or more periodic processing tasks on the same day or earlier days for the same account. However, from the standpoint of running the system, the same is achieved as long as it is enforced that a periodic processing task instance (across all accounts) for a given day is dependent on one or more task instances (across all accounts) on the same day or earlier days. As a further refinement, the system can be broken into logical chunks, e.g., twelve chunks based on the month of sign-up date or twenty-six chunks based on first character in their last name. These chunks are independent of each other and can be treated as a separate logical periodic processing unit. Thus, if a subscription expiration task depends on notification task, a logical unit for the "February chunk" can start processing "subscription expirations" even though the "March chunk" is still working on "notifications."

In bulk mode, the same inter-task dependencies that are required for each account within each days processing of these tasks, is maintained. Additionally, tasks slated for completion of a first day must be completed the first day, and in the proper order, before the same tasks can be run the following day. To facilitate effective bulk mode processing, an account, if required, will be picked appropriately by each task. The cumulative effect of the disclosed architecture similar to account-level enforcement of these task dependencies, which works fine, as long as an account does not encounter any errors.

In error mode (also called a retry/reprocess mode), if an account produces any error for any of the tasks during bulk-mode processing, this account is removed from bulk-mode processing, and immediately becomes ineligible for fetching in any future bulk-mode task processing. This is required to enforce inter-task dependency at an account-level. These error accounts are then picked up by error-mode processing, where each task is processed against the account starting at the task instance in which it failed, and processed appropriately when required. Error-mode processing attempts to test and process all tasks for an account sequentially in a strict order until the account state is in par with the rest of accounts being processed by bulk mode, in terms of time. Once the account is processed in error mode to the point in time par with bulk-mode processing, the account is removed from error mode processing and the account then is inserted back into bulk-mode processing. Although error-mode processing uses the inefficient strategy of conventional accounts processing, it is now being done for only a relatively small number of accounts when compared to bulk-mode processing.

Additionally, the disclosed architecture provides the capability to scale up using multiple instances of the task processor running for a sub-set of accounts either based on physical partitions or logical partitions (many such partitions are possible).

Performance of one of the tasks, called Subscription Cycle End Processing (SCEP), can be further improved by precisely predicting when a subscription needs to be processed next. This reduces the number of times non-monthly subscriptions need to be processed from twelve times a year to as low as once a year, for example.

The system 100 is a common framework that facilitates the adding of additional tasks to periodic task processing and enforcing dependencies. The framework also offers the use of a specialized threading infrastructure, the logging of processing errors, event logging, and cached utility objects.

User/CSR/Partner initiated operations through the front-end always can work on the most up-to-date accounts due to account level catch-up processing, in a scenario where the back-end is not operating.

Additionally, more complex dependencies can be modeled between tasks (perhaps spanning multiple days).

Figure 2:
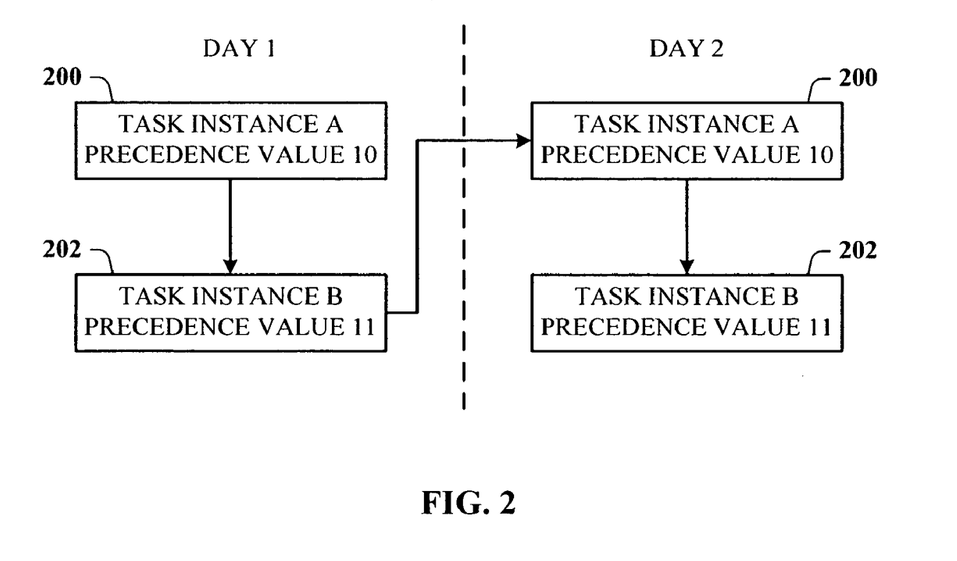
FIG. 2 illustrates a flow diagram representative of task dependencies.

Referring now to FIG. 2, there is a flow diagram representative of task dependencies. As indicated previously, task processing occurs according to dependencies and on a daily basis. For example, on a first day, a first task (also denoted Task Instance A) 200 has a precedence value (Precedence Value 10) that indicates it must be processed before a second task (also denoted Task Instance B) 202 with a precedence value (Precedence Value 11). The following day, Day 2, the same tasks (200 and 202) will be processed in the same order (i.e., based on the same precedence). However, tasks (200 and 202) must be completed properly on Day 1 before they can be processed on Day 2. In general, a task A for a date D can be dependent on various tasks instances for the previous days and also a subset of tasks for D. These dependencies can be represented as, <A, D>:=(A, D-1), (B, D-2), (C, D-i), (E, $f$(D)), where $f$ is a function of D and can return anything less than or equal to D.

Figure 3:
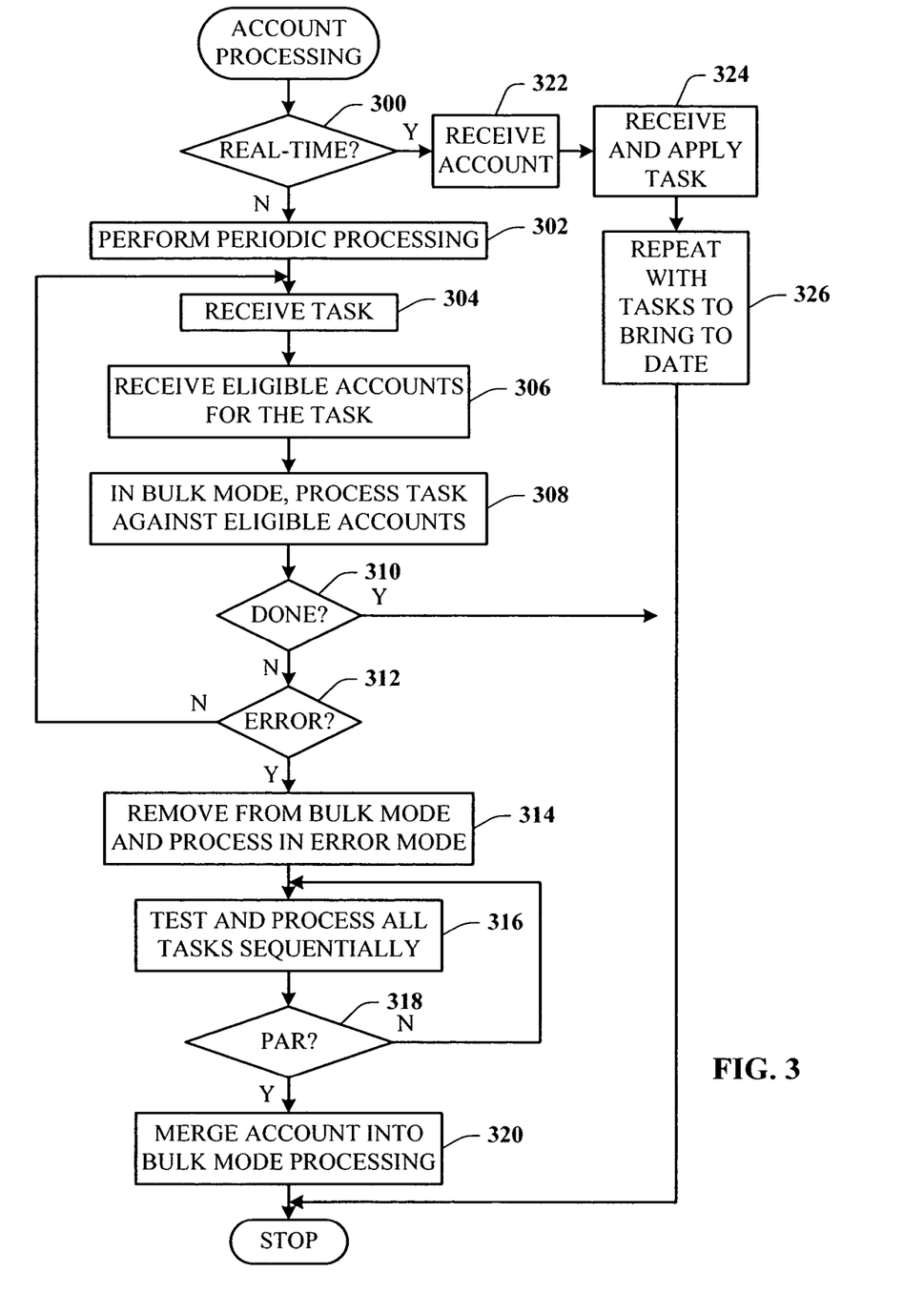
FIG. 3 illustrates a flow chart of account processing according to the present invention.

The only requirement is that there be no cycle in dependency. Otherwise, these dependencies could be arbitrary. There are a number of ways to express and enforce these dependencies. In a specific implementation, for simplicity no tasks are chosen for a day D that can start until all tasks for day D-1 are finished. Referring now to FIG. 3, there is illustrated a flow chart of account processing according to the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 300, the system determines if real-time processing is to be performed. If NO, flow is to 302 to perform periodic processing. At 304, a task is received. At 306, the eligible accounts for that task are identified. In bulk mode, the task is processed against the eligible accounts, as indicated at 308. At 310, the system determines if periodic processing has completed. If NO, flow is to 312, where the system determines if an error has been detected. If NO, flow is back to the input of 304 to receive the next task, and process it against a set of eligible accounts. On the other hand, if periodic processing has completed, flow is from 310 to a Stop block.

If an error is detected, flow is from 312 to 34, where the account is removed from bulk processing and processed in error mode. At 316, the tasks are received and processed sequentially against the account. At 318, if the system determines that the errored account is not yet par with bulk processing, flow if from 318 back to the input of 316 to continue processing the tasks. However, if the errored account is now par with bulk processing, flow is from 318 to 320 to merge the account in with bulk processing. The process then reaches the Stop block.

As indicated previously, the disclosed architecture is capable of real-time processing. Thus, if the system determines that real-time processing is required, flow is from 300 to 322 to receive the account to be processed. At 324, a task is received and applied against the account. At 326, other tasks are received an applied, as required, until the account is brought to the date desired. This can be a past date, the current date or to a date in the future. Flow is then to the Stop block. It is to be appreciated that SCEP applies to a subscription account for a given date, and to a whole set of accounts for periodic processing.

In an alternative implementation, the system can be configured to receive a set of accounts for a set of tasks, and then processed accordingly in bulk mode.

At 300, the tasks related to the particular accounts are defined and implemented for account processing. At 302, preparation is made for bulk mode processing by using the tasks to determine a group of eligible accounts. Each task has an identifiable number of the accounts to which the task is applied. Although not a requirement, any two or more of the tasks can be applied against the same account. Thus, where a first task is processed against a first account and a second account, a second task can be processed again the first account and a third account. At 304, once the eligible accounts have been identified for the given task, bulk mode processing is commenced by processing the eligible accounts. At 306, the system determines if an error has occurred on an account. If NO, flow is back to the input of 304 to continue bulk mode processing. If an error is detected, flow continues from 306 to 308 where the removal component automatically removes the errored account from bulk mode processing, and sets the account up for error mode processing. At 310, catch-up mode processing is performed by testing and processing all tasks sequentially against the errored account. Once task processing for the errored account has been completed, flow is to 312 to determine if the error-mode processing (also called catch-up mode processing) has caught up temporally with bulk mode processing. If NO, flow is back to the input of 310 to continue catch-up processing. If YES, flow is to 314 to merge the account back into bulk-mode processing. Flow then loops back to the input of 302 to continue bulk mode processing.

Figure 4:
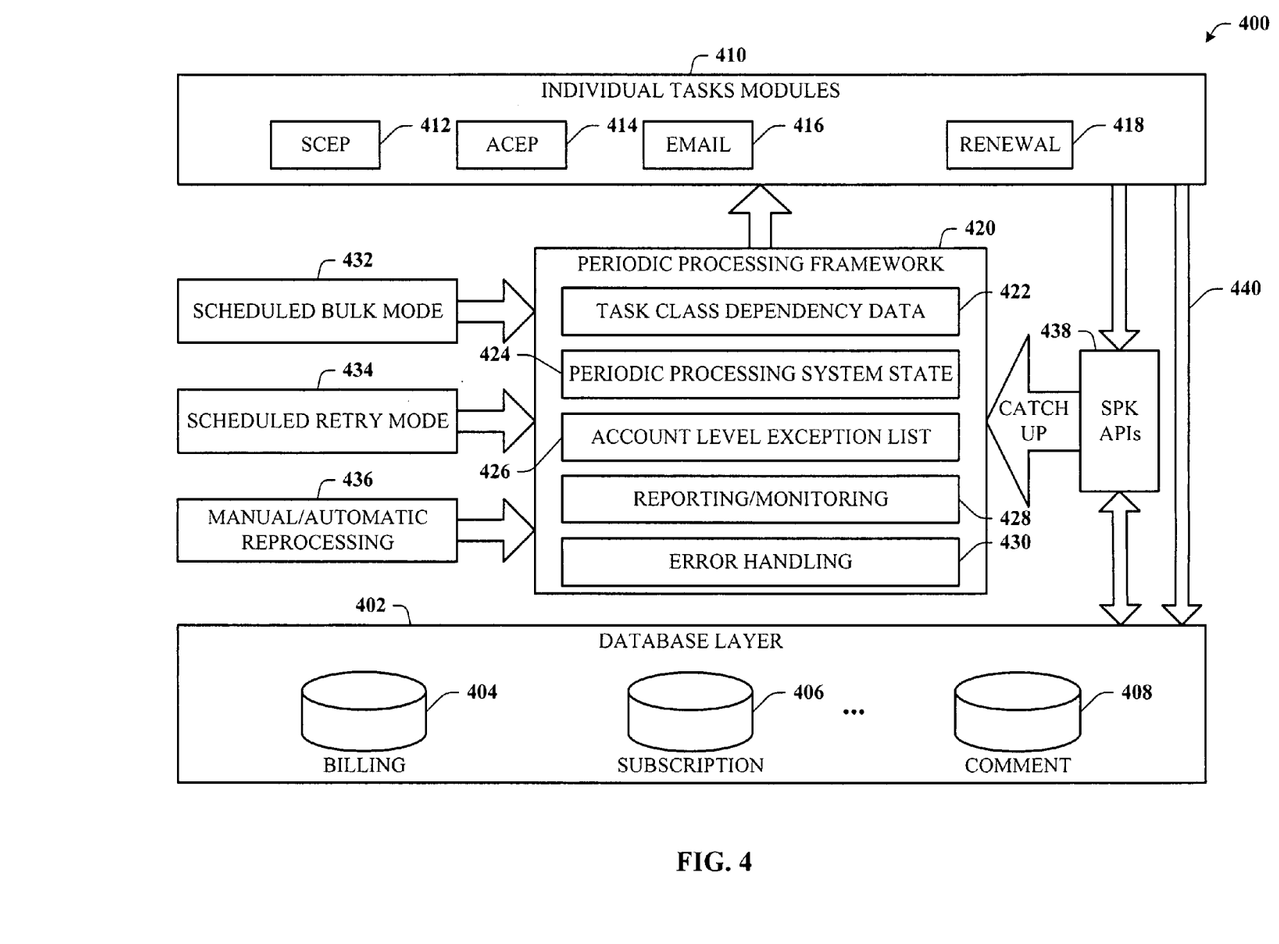
FIG. 4 illustrates a more detailed block diagram of a system of the present invention.

Referring now to FIG. 4, there is illustrated a more detailed block diagram of a system 400 of the present invention. The system 400 includes a database layer 402 of data that is used in the processing architecture. The database layer 402 includes data such as billing information 404, subscription information 406, and comment information 408, just to name a few. The system 400 also includes a number of tasks 410, which includes the SCEP 412, an ACEP (Accounts Cycle End Processing) task 414, an E-mail task 416, and a renewal task. Of course, there can be more tasks or fewer tasks.

In this particular embodiment, the first and largest task 412 is the SCEP, which calculates what the charges are, the hours, usage and dollars owed based on subscriber usage. A second task 414 is account cycle end processing (ACEP), which processes multiple subscriptions, determines charges for the various subscriptions, aggregates the charges, and processes the charges against the bank. A third task 416 is related to sending an e-mail to the subscriber according to account requirements. A fourth task 418 is related to renewals, which occur on a daily basis, and which can involve year-end (or annual) subscriptions. Thus, a notification such as an email can be generated and sent to the subscriber indicating that a subscription is up for renewal. Here, the dependency can be such that the renewal task is dependent on the e-mail task, or vice versa. Another messaging/renewal example can be giving 30-day notice in the form of an e-mail at a current price point. If no response, the subscriber is automatically renewed at that price point. After e-mails have been generated and sent, the e-mail task 416 can be related to receiving and processing e-mail responses.

The system 400 includes a periodic processing framework 420 that provides data to the tasks module 410. The framework 420 processes task class dependency data 422 relating to the set of tasks being processed against the eligible accounts, maintains periodic processing system state data 424 related to the current state of the system, generates an account level exception list data 426 of exceptions generated during the bulk processing, performs reporting and monitoring 428 related to at least bulk processing and removing an errored account, and provides error handling 430 related to an error generated by the errored account.

Inputs to the framework 420, include a bulk mode scheduling component 432 that schedules bulk mode processing, a retry mode scheduling component 434 that schedules a low number of automatic retries (e.g., three or four times) of an account that has generated an error with the hope that the error automatically resolves itself, and a manual/automatic reprocessing component 436, where if an account has been erroring too many times, user intervention is required to resolve or to assist in working through the processing phase.

In bulk mode, any account that is determined to have an error for a given task will not have the subsequent tasks performed against it. In error mode, the account with the error will have all tasks applied until the error clears. The account can then be returned to bulk mode processing. An error can occur from a variety of reason, e.g., a network glitch, data problem, code bug, etc., that impacts the account such that an error is produced.

The system 400 also includes an SPK (subscription processing kit) API (application programming interface) component 438 that accesses tasks from the tasks module 410, data from the database layer 402, and output catch-up information to the framework 420. The tasks information and database information is then used to perform catch-up while in the error processing mode, such that when the previously errored account has all related tasks processed successfully against it without error, and the account is par with the bulk mode processing, the account can now be merged back in with bulk mode processing.

The tasks module 410 also interfaces directly to the database layer 402 to process stored procedural calls 440.

In one scenario, for example, a user subscription anniversary is the $20^{th}$ of January. The user calls on January $21^{st}$ and requests immediate cancellation of the account and the charges incurred up to that point in time. The back-end periodic process SCEP has not yet acted on this account to compute new charges for the $20^{th}$. The SPK 438 includes a cancellation API that can be employed to handle this situation, by bringing the account current, since the system processing always lags real-time by a small amount. When a Cancel API is called, it detects that the account is not current, and calls another component to make this account current. This component works on this account in a manner similar to error mode processing, by evaluating all possible actions. It differs from error-mode processing by bringing this account current to the specified data even though the overall system is farther behind. Since the customer is calling, and wants the result now, not all tasks may be required to be run, for example, the email task. The command to the system is to take this account, and if it is not current, make it current; if the account is already current, do not perform any operation, but report out the requested information.

The periodic processing framework 420 makes it very easy to add a new job. This can be performed by writing a SQL (Structured Query Language) query that will return the eligible candidate accounts. The framework 420 executes the query in a way that will not interfere with ongoing processes, and returns thousands of accounts at a time. Note that processing a large number of accounts (e.g., millions of accounts) utilizes too many resources. Thus, typically, a predetermined subset of accounts is requested, for example, the top one hundred accounts on which a task is to be performed. This is then repeated for the remaining subsets of accounts until no more accounts are available for processing. This provides a number of candidate accounts, and verifies execution of those accounts. The framework 420 monitors how many tasks are failing or and how many are not failing. The framework 420 also allows a status for a previous duration of time, e.g., the last few days, the last week, etc., which is historical data that is maintained. Specific errors to specific tables are monitored and can be reprocessed. The framework 420 is basically the daily health maintenance of the system 400, and has the capability to move one or more accounts ahead in time as time passes so that the account can be invoiced and charges can be are sent before the services have actually accrued. The framework 420 processes charges, renewals, expirations (when the time comes), sends messages (e.g., e-mails), and other forms of information, and closes accounts.

Figure 5:
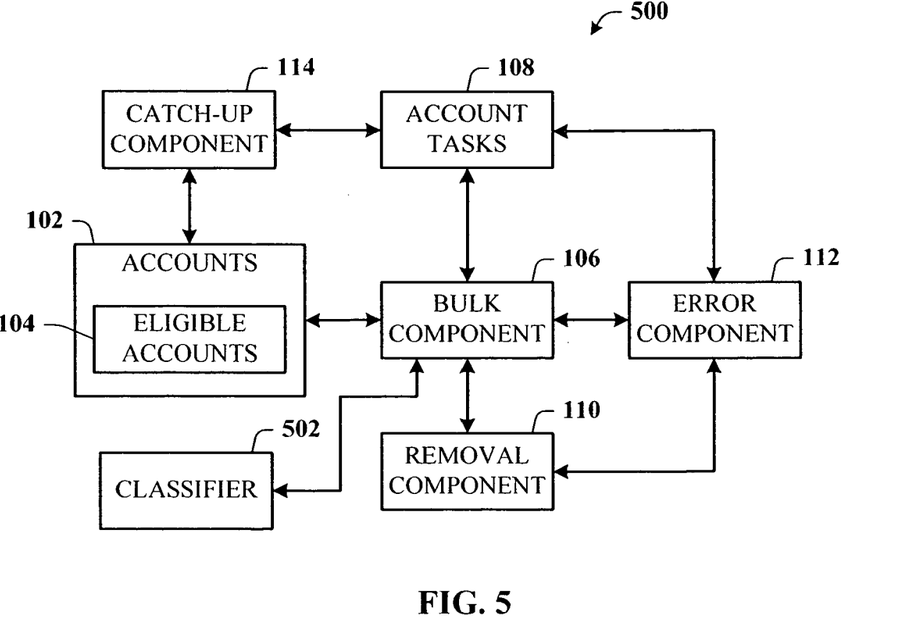
FIG. 5 illustrates a system of the present invention that addresses account interdependencies by employing a classifier.

Referring now to FIG. 5, there is illustrated a system 500 of the present invention that addresses account interdependencies by employing a classifier 502 in the system 100 of FIG.

1. In one implementation, there is no dependency across accounts. In another implementation, accounts have interdependency. In such a case, an action on an account does not change the dependency on that account. In support thereof, there can be a predetermined threshold level of the number of dependencies associated with an account, where if the number of dependencies is below the threshold, all dependent accounts are considered inconsistent. If above the threshold, then the system deals with those accounts autonomously, and ignores the dependencies.

The subject invention can employ various artificial intelligence based schemes for carrying out various aspects of the subject invention. For example, a process for determining the number of account dependencies can be facilitated via an automatic classification system and process. Additionally, or alternatively, the classifier can be used to aid the system in facilitating self-throttling such that system resources such as I/O, memory, and processor usage (or any combination thereof) are maintained under a predetermined threshold.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of account processing systems, for example, attributes are words or phrases or other data-specific attributes derived from the accounts (e.g., database tables, the presence of key terms), and the classes are categories or areas of interest (e.g., levels of priorities).

For example, a support vector machine (SVM) classifier can be employed. An SVM operates by finding a hypersurface in the space of possible inputs. This hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) may be used to automatically determine the threshold level depending on various criteria of the accounts, e.g., type of data, vendor of the data, user interaction required for the account over time, and other rules. More rules could be implemented based on what kind of task it is, what kind of error it is, etc. Some dependencies will be affected by the particular task or tasks, and other dependencies will not be affected by the particular task. Over time, a knowledge base can be generated and used to predict how a given error will propagate across, e.g., 30,000 accounts.

Referring again to FIG. 5, the classifier 502 interfaces to the bulk component 106 and the account tasks component 108 to determine and learn the number of account dependencies that can occur based on the specific task, and to automatically adjust the threshold level according to the accounts, and other criteria, as desired.

Figure 6:
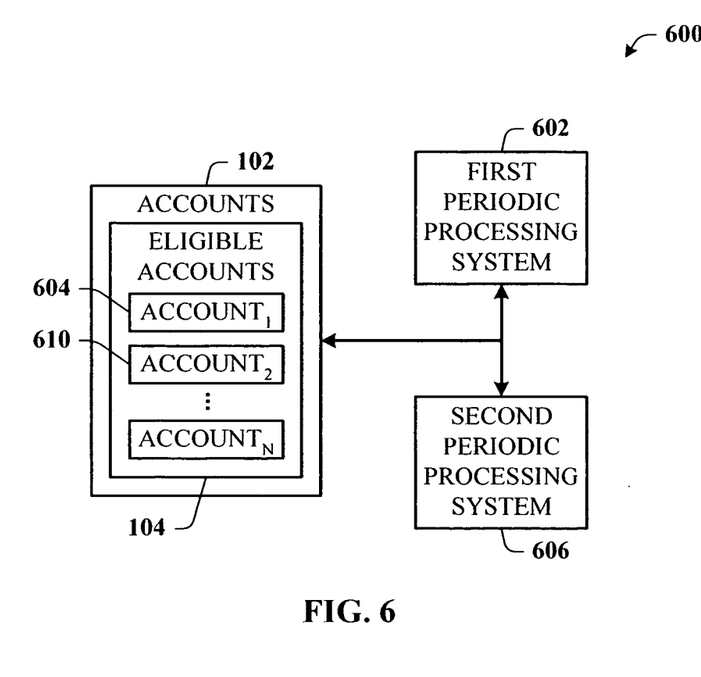
FIG. 6 illustrates a block diagram of a distributed system that acts on one account.

Referring now to FIG. 6, there is illustrated a block diagram of a distributed system 600 that acts on one account. There is provided a number of accounts 102 of which there is a subset of eligible accounts 104 selected for processing according to the particular tasks to be performed. A first system 602 (similar to the system 100 having the bulk component 106, account tasks component 108, the removal component 110, and error component 112) processes a task on one account 604 (also denoted $ACCOUNT_1$) of the eligible accounts 104, and determines that the selected eligible account 604 has an error. Once it has been determined that the selected account 604 has an error, the first system 602 can signal a second system 606, which second system 606 will not waste processing time by processing the same account 604. Thus, the first system 602 functions as a filter to the second system 606. Essentially, this at least increases the efficiency of the second system 606, and the overall system 600, as a whole.

In a similar implementation, the first system 602 and the second system 606 are controlled to process eligible accounts on an interleaved basis. That is, the first system 602 processes the first account 604 and the second system 606 processes a second account 608 (also denoted $ACCOUNT_2$). If the first system 602 determines that the first account is errored, it signals the second system 606 to ignore processing of the first account 604. Similarly, if the second system 606 determines that the second account 610 is errored, the second system 606 signals the first system 602 to skip processing of the second account 610. Thus, errored account information is passed between the two systems (602 and 606) such that neither system (602 and 606) wastes time processing an account that has already been determined to be errored by the other system.

Figure 7:
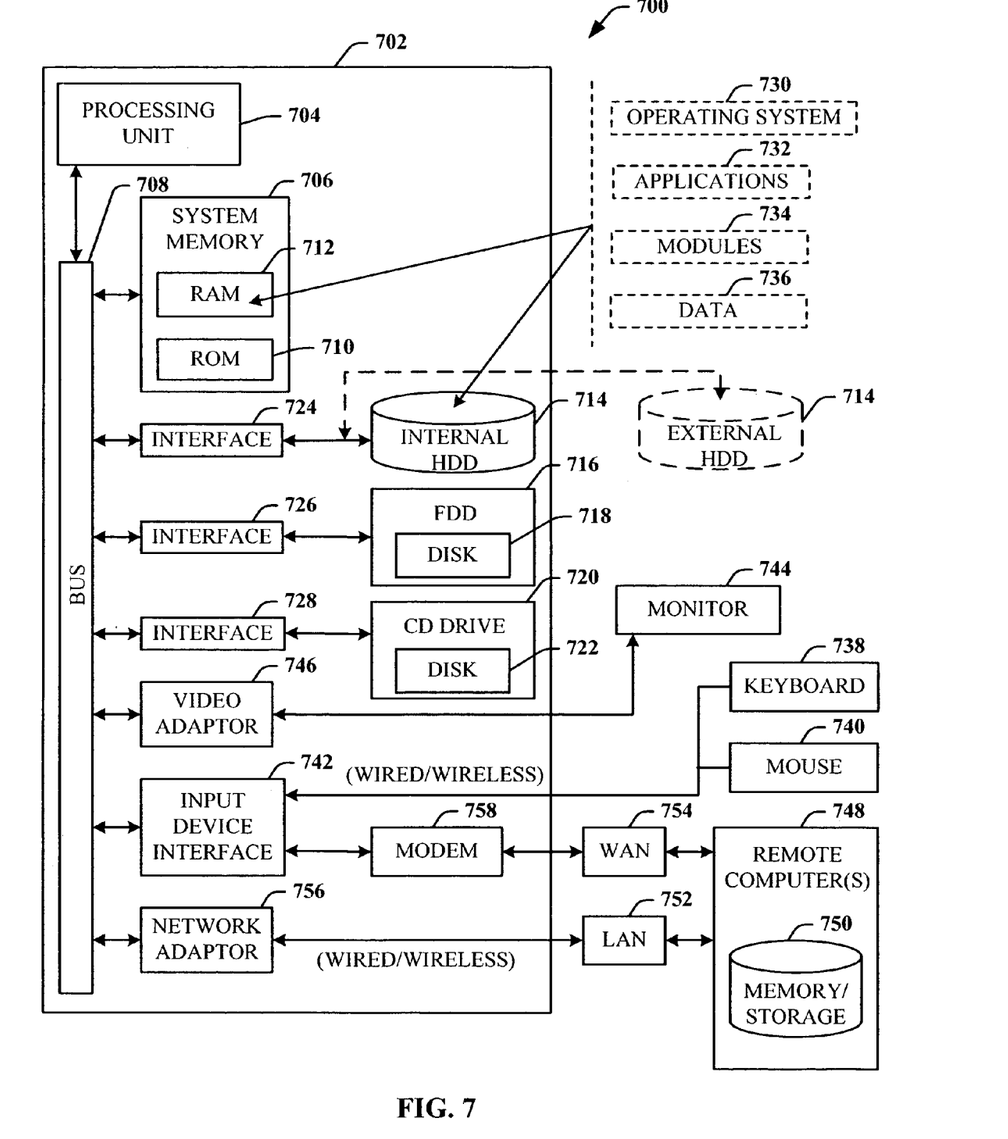
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the present invention, FIG. 7 and the following discussion are intended to provide a brief, general description of a suitable computing environment 700 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data. Combinations of the any of the above should also be included within the scope of computer-readable media.

With reference again to FIG. 7, there is illustrated an exemplary environment 700 for implementing various aspects of the invention that includes a computer 702, the computer 702 including a processing unit 704, a system memory 706 and a system bus 708. The system bus 708 couples system components including, but not limited to, the system memory 706 to the processing unit 704. The processing unit 704 may be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 712, including an operating system 730, one or more application programs 732, other program modules 734 and program data 736. All or portions of the operating system, applications, modules, and/or data can also be cached in the RAM 712.

It is appreciated that the present invention can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but may be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers etc.

The computer 702 may operate in a networked environment using logical connections via wired and/or wireless communications to one or more remote computers, such as a remote computer(s) 748. The remote computer(s) 748 may be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices, and companies, and facilitate enterprise-wide computer networks, such as intranets, all of which may connect to a global communication network, e.g., the Internet.

When used in a LAN networking environment, the computer 702 is connected to the local network 752 through a wired and/or wireless communication network interface or adapter 756. The adaptor 756 may facilitate wired or wireless communication to the LAN 752, which may also include a wireless access point disposed thereon for communicating with the wireless adaptor 756. When used in a WAN networking environment, the computer 702 can include a modem 758, or is connected to a communications server on the LAN, or has other means for establishing communications over the WAN 754, such as by way of the Internet. The modem 758, which may be internal or external and a wired or wireless device, is connected to the system bus 708 via the serial port interface 742. In a networked environment, program modules depicted relative to the computer 702, or portions thereof, may be stored in the remote memory/storage device 750. It will be appreciated that the network connections shown are exemplary and other means of establishing a communications link between the computers may be used.

The computer 702 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 8:
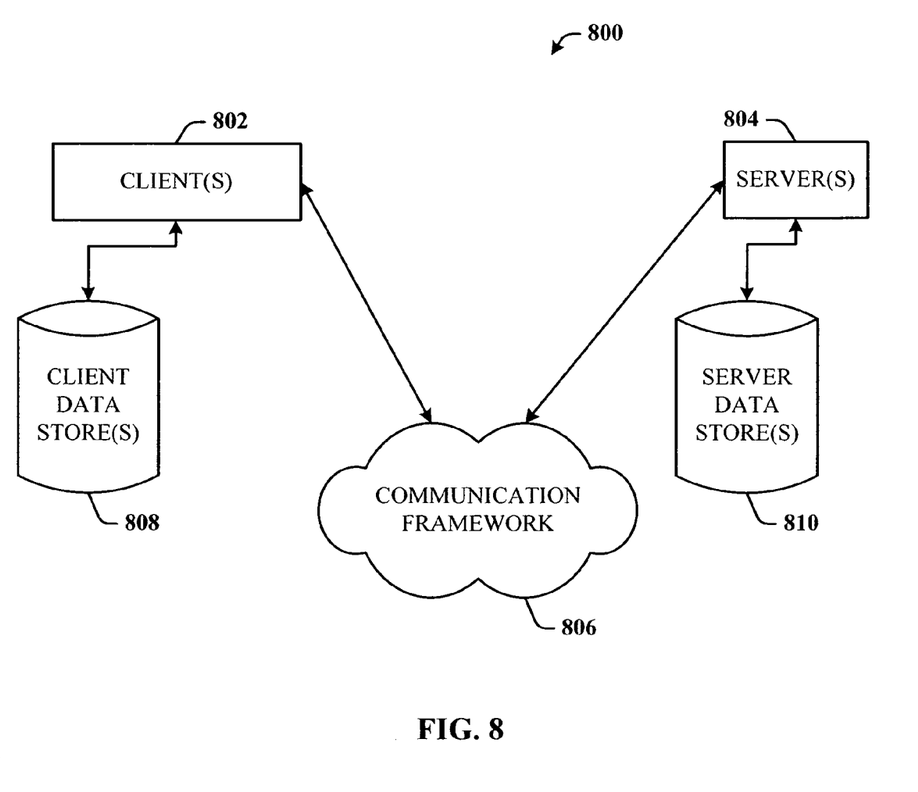
FIG. 8 illustrates a schematic block diagram of an exemplary computing environment in accordance with the present invention.

Referring now to FIG. 8, there is illustrated a schematic block diagram of an exemplary computing environment 800 in accordance with the present invention. The system 800 includes one or more client(s) 802. The client(s) 802 can be hardware and/or software (e.g., threads, processes, computing devices). The client(s) 802 can house cookie(s) and/or associated contextual information by employing the present invention, for example. The system 800 also includes one or more server(s) 804. The server(s) 804 can also be hardware and/or software (e.g., threads, processes, computing devices). The servers 804 can house threads to perform transformations by employing the present invention, for example. One possible communication between a client 802 and a server 804 may be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications may be facilitated via a wired (including optical fiber) and/or wireless technology. The client(s) 802 are operably connected to one or more client data store(s) 808 that can be employed to store information local to the client(s) 802 (e.g., cookie(s) and/or associated contextual information). Similarly, the server(s) 804 are operably connected to one or more server data store(s) 810 that can be employed to store information local to the servers 804.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. For example, one or more accounts can be processed in parallel using a plurality different computing systems or a plurality of computing subsystems in a single computing system. Moreover, accounts can be processed in parallel by different threads of execution using a single computing system or processor. In another implementation, the tasks or processes can only be initiated by a user on a control list. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates task processing, the system comprising one or more computing devices having a processor and a memory and configured to provide:
   a bulk component that periodically, concurrently processes in a bulk mode, a plurality of eligible accounts with a set of dependent tasks, wherein a first set of eligible accounts is fetched for bulk processing based on one or more first preset criteria for a first task in the set of dependent tasks, and a second set of eligible accounts is fetched for bulk processing based on one or more second preset criteria for a second task in the set of dependent tasks, wherein the first set of eligible accounts, the first task, and the first preset criteria are not identical to the second set of eligible accounts, the second task, and the second preset criteria respectively, and wherein the tasks in the set of dependent tasks include accounting operations to be completed for the accounts in the plurality of eligible accounts;
   a removal component that removes an account from the eligible accounts and from bulk processing as an errored account when an error is associated therewith, wherein the errored account is made ineligible for fetching for future bulk mode processing; and
   an error component that processes the errored account to resolve the error associated therewith,
   wherein the dependent tasks processed on a first day must be processed error-free before the same tasks can be processed on a succeeding day, and
   wherein the system is restrained to keep utilization of system resources under a first predetermined threshold when a number of dependencies associated with an account are below a second threshold, the first predetermined threshold defining a limit on the use of system resources.

2. The system of claim 1, wherein the tasks are processed sequentially against the plurality of eligible accounts according to task dependencies.

3. The system of claim 1, wherein the errored account is merged back into bulk mode processing by the bulk component when the error associated therewith has been resolved.

4. The system of claim 1, wherein the errored account is merged back into bulk mode processing only when the errored account has been resolved temporally with bulk mode processing of the bulk component.

5. The system of claim 1, wherein the system further comprises a catch-up component for real-time processing of an account.

6. The system of claim 1, wherein the plurality of eligible accounts is processed in parallel by one or more computing devices.

7. The system of claim 1, wherein the plurality of eligible accounts is processed in parallel by different threads of execution on a single computing device.

8. The system of claim 1, wherein the plurality of eligible accounts is processed in accordance with an access control list.

9. A system that facilitates task processing, comprising one or more computing devices having a processor and a memory and configured to provide:
   a bulk component that periodically processes a plurality of eligible accounts with a set of dependent tasks, wherein a first set of eligible accounts is fetched for bulk processing based on one or more first preset criteria for a first task in the set of dependent tasks, and a second set of eligible accounts is fetched for bulk processing based on one or more second preset criteria for a second task in the set of dependent tasks, wherein the first set of eligible accounts, the first task, and the first preset criteria are not identical to the second set of eligible accounts, the second task, and the second preset criteria respectively, and wherein the tasks in the set of dependent tasks include accounting operations to be completed for the accounts in the plurality of eligible accounts;

a removal component that removes an account from the eligible accounts as an errored account when an error is associated therewith, wherein the errored account is made ineligible for fetching for future bulk processing;

an error component that processes the errored account to resolve the error associated therewith, now a resolved account, merges the resolved account with the eligible accounts for bulk processing by the bulk component, and identifies the resolved account as eligible for fetching for future bulk processing, wherein the resolved account is merged with the eligible accounts for bulk processing when processing of the resolved account is temporally aligned with the bulk processing; and a catch-up component that facilitates real-time processing of an account, wherein processing of the account is brought up-to-date to a specified date that is temporally equal to or ahead of bulk processing of the plurality of eligible accounts, wherein the bulk component repeatedly processes the errored account up to a predetermined number of attempts before the errored account is removed by the removal component for error processing, and wherein the system performs periodic processing of subscriber accounts.

10. The system of claim 9, wherein the tasks are processed sequentially against the plurality of eligible accounts according to task dependencies.

11. The system of claim 9, wherein the bulk component and the error component process accounts concurrently.

12. One or more computer-readable storage media having computer-executable instructions tangibly embodied thereon that, when executed by a computing device having a processor, perform a method of processing tasks, the method comprising:

fetching a plurality of sets of eligible accounts for which a different respective task is to be processed in bulk for each of the sets of eligible accounts, each task including a unique set of criteria based upon which the eligible accounts are selected for inclusion in a respective set;

periodically processing in bulk, via a computing device having a processor, each of the plurality of sets of eligible accounts with the respective tasks to keep the one or more eligible accounts synchronized;

reprocessing one of the one or more eligible accounts from the plurality of sets of eligible accounts when the one eligible account exhibits an error, wherein the one eligible account is reprocessed up to a predetermined number of attempts:

removing the one eligible account as an errored account when the one eligible account exhibits an error after reprocessing;

identifying the one eligible account as ineligible for fetching for future bulk processing; and error processing the errored account with the set of tasks to resolve the error, wherein processing of the respective tasks is restrained to keep utilization of system resources under a predetermined threshold, the predetermined threshold defining a limit on the use of system resources.

13. The media of claim 12, wherein the method further comprises merging the erred account that has been resolved with the one or more eligible accounts for further processing in bulk.

14. The media of claim 12, wherein the processing in bulk further comprises, processing task dependency data related to the set of tasks;
maintaining system state data of the system;
generating an account level exception list of exceptions generated during the processing in bulk;
monitoring and reporting system processes related to at least bulk processing, removing an errored account; and
providing error handling related to an error generated by the errored account.

15. The media of claim 12, wherein the method further comprises reprocessing the errored account before requiring manual intervention to initiate further reprocessing.

16. The media of claim 12, wherein the method further comprises predicting when subscription cycle end processing needs to be performed next.

17. A computer-implemented a method of periodic processing of subscription accounts, the method comprising:

fetching a plurality of eligible accounts for which a plurality of tasks are to be processed in bulk, each task including a unique set of criteria based upon which the eligible accounts are selected for inclusion in a respective set, and at least one of the respective sets including an eligible account that is not included in at least one other respective set;

processing in bulk, via a first computing device having a processor, the sets of eligible accounts with their respective task periodically to keep the plurality of eligible accounts synchronized;

reprocessing, by a second computing device having a processor, one of the plurality of eligible accounts when the one eligible account exhibits an error, wherein the first and second computing devices are the same or different computing device:

removing the one eligible account from bulk processing as an errored account when the one eligible account exhibits an error after a predetermined number of attempts to reprocess the one eligible account;

identifying the errored account as ineligible for fetching for future bulk processing;

error processing the errored account with the set of tasks to resolve the error in the errored account, now a resolved account;

identifying the resolved account as eligible for fetching for future bulk processing; and merging the processing of the resolved account with the bulk processing when error processing and bulk processing are temporally aligned, wherein processing of the respective tasks is restrained to keep utilization of system resources under a predetermined threshold, the predetermined threshold defining a limit on the use of system resources.

18. The method of claim 17, wherein the method further comprises determining according to a predetermined threshold level when a second account that is dependent on a first account is considered inconsistent.

19. The method of claim 18, wherein the method further comprises employing a classifier to automatically determine the threshold level that facilitates determining when a dependent account is inconsistent.

20. A system that facilitates the periodic processing of accounts, the system comprising:
- a first group of one or more computing devices having a processor and a memory that processes a set of tasks against a plurality of accounts; and
- a second group of one or more computing devices having a processor and a memory that periodically processes the same set of tasks against the plurality of accounts,
- wherein the first group removes a first account in the plurality of accounts from processing and signals the second group to bypass processing of the first account when the first group determines an error in the first account,
- wherein the first group reprocesses the first account with up to a predetermined threshold number of attempts to resolve the error in the first account prior to signaling the second group, and
- wherein processing the set of tasks is restrained to keep utilization of system resources under a predetermined threshold, the predetermined threshold defining a limit on the use of system resources.

21. The system of claim 20, wherein the second group signals the first group to bypass processing of a second account of the plurality of accounts when the second group determines an error in the second account.

22. A system that facilitates task processing, the system comprising one or more computing devices having a processor and a memory that are configured to provide:
- a bulk component that periodically, concurrently bulk processes a plurality of eligible accounts with a set of dependent tasks and the bulk component identifies an account from the plurality of eligible accounts that has an error associated therewith as an errored account and repeatedly reprocesses the errored account up to a predetermined number of attempts;
- a removal component that removes the errored account from bulk processing and identifies the errored account as ineligible for fetching for future bulk processing when the repeated reprocessing is unsuccessful;
- an error component that processes the errored account to resolve the error associated therewith producing a resolved errored account, identifies the resolved errored account as eligible for fetching for future bulk processing, and merges the processing of the resolved errored account with bulk processing of the eligible accounts by the bulk component when the processing of the resolved errored account is temporally aligned with the bulk processing; and
- a catch-up component that facilitates real-time processing of an account,
- wherein the bulk component processes the errored account with up to a predetermined threshold number of attempts to resolve the errored account,
- wherein the system is restrained to keep utilization of system resources under a predetermined threshold that defines a limit on the use of system resources.

* * * * *